United States Patent
Sun et al.

(10) Patent No.: US 12,391,852 B2
(45) Date of Patent: Aug. 19, 2025

(54) METHOD FOR PREPARING ACRYLATE LAMINATING ADHESIVE BY SOAP-FREE EMULSION POLYMERIZATION

(71) Applicant: JIANGSU JINGHONG NEW MATERIALS TECHNOLOGY CO., LTD., Suqian (CN)

(72) Inventors: Dawei Sun, Suqian (CN); Zhijian Du, Suqian (CN); Zhuang Ding, Suqian (CN); Quanwei Gao, Suqian (CN)

(73) Assignee: JIANGSU JINGHONG NEW MATERIALS TECHNOLOGY CO., LTD., Suqian (CN)

( * ) Notice: Subject to any disclaimer, the term of this patent is extended or adjusted under 35 U.S.C. 154(b) by 45 days.

(21) Appl. No.: 17/762,661

(22) PCT Filed: Sep. 14, 2021

(86) PCT No.: PCT/CN2021/118108
§ 371 (c)(1),
(2) Date: Mar. 22, 2022

(87) PCT Pub. No.: WO2022/237025
PCT Pub. Date: Nov. 17, 2022

(65) Prior Publication Data
US 2024/0052215 A1 Feb. 15, 2024

(30) Foreign Application Priority Data
May 11, 2021 (CN) .......................... 202110508970.2

(51) Int. Cl.
*C09J 151/00* (2006.01)
*C08F 2/22* (2006.01)
*C08F 2/38* (2006.01)
*C08F 287/00* (2006.01)

(52) U.S. Cl.
CPC .............. *C09J 151/006* (2013.01); *C08F 2/22* (2013.01); *C08F 2/38* (2013.01); *C08F 287/00* (2013.01); *C08F 2438/03* (2013.01)

(58) Field of Classification Search
CPC .............. C08F 287/00; C08F 220/1804; C08F 220/14; C08F 220/20; C08F 220/1808
See application file for complete search history.

(56) References Cited

U.S. PATENT DOCUMENTS 5,461,103 A * 10/1995 Bafford ................. C08F 265/06
524/460
2016/0319169 A1 * 11/2016 Gower .................. C08F 293/00

FOREIGN PATENT DOCUMENTS

CN 1740257 * 3/2006

OTHER PUBLICATIONS

Gaillard, Journal of Polymer Science Part A: Polymer Chemistry vol. 41, Issue 5, p. 625-724 (2003) (Year: 2003).*

* cited by examiner

*Primary Examiner* — K. Boyle
(74) *Attorney, Agent, or Firm* — Ohlandt, Greeley and Perle, L.L.P.

(57) ABSTRACT

A method for preparing an acrylate laminating adhesive by soap-free emulsion polymerization, and an acrylate laminating adhesive prepared by soap-free emulsion polymerization. In the method, an acrylate block oligomer with emulsifiability is synthesized by using a RAFT active radical polymerization process, and an acrylate monomer is emulsified by using the acrylate block oligomer for a semi-continuous emulsion polymerization, which overcomes a defect that traditional small molecule emulsifiers tend to migrate to a surface of an adhesive film to form a weak interface layer, resulting in a decreased bonding strength, a poor water resistance and the like. Further, in the disclosure, the use of n-pentanol as a chain transfer agent could not only reduce the molecular weight of polymer, improving fluidity and laminating uniformity of the adhesive, but also reduce the surface tension of the emulsion, improving coating wettability and levelling properties of the acrylate laminating adhesive.

19 Claims, No Drawings

METHOD FOR PREPARING ACRYLATE LAMINATING ADHESIVE BY SOAP-FREE EMULSION POLYMERIZATION

CROSS REFERENCE TO RELATED APPLICATION

This patent application claims the priority of Chinese Patent Application No. 202110508970.2, entitled by "Method for preparing acrylate laminating adhesive by soap-free emulsion polymerization" filed with the Chinese National Intellectual Property Administration on May 11, 2021, the disclosure of which is incorporated by reference herein in its entirety as part of the present application.

TECHNICAL FIELD

The present disclosure relates to the technical field of aqueous pressure-sensitive adhesives, and specifically to a method for preparing an acrylate laminating adhesive by soap-free emulsion polymerization.

BACKGROUND ART

Aqueous acrylate laminating adhesives comprise water as a dispersion medium, and a polymer which is stably dispersed in water in the form of particles. At present, it is generally necessary to laminate plastic-plastic, aluminum-plastic and other flexible packaging materials in the packaging fields of electronic products, food, medicine, cosmetics and the like. Currently, adhesives for laminating such flexible packaging materials are mostly solvent-based polyurethane adhesives; however, the use of which in fields with strict safety requirements such as food, medicine, and cosmetics constitutes potential safety risks. In addition, with people's increasing attention to environmental protection, safety and energy saving, it is urgent to develop an aqueous laminating adhesive suitable for flexible packaging materials in the above-mentioned fields.

Acrylic acid emulsion laminating adhesive is a major category of environmentally friendly adhesives, but the current aqueous acrylic acid emulsion laminating adhesives still have some defects, such as inferior laminating strength and water resistance compared to solvent-based products, poor water resistance, and limited adaptability to a substrate.

CN111440268B discloses an aqueous laminating adhesive prepared by using a (meth)acrylic acid monomer, a (meth)acrylate monomer, an acrylonitrile monomer and a vinyl oxidized starch as reactant monomers for emulsion copolymerization, and using $\alpha,\omega$-di(active group)siloxane as a crosslinking agent, which could be applied to the laminating of plastic-plastic, aluminum-plastic, polyethylene glycol terephthalate (PET)-aluminum foil and other flexible packaging materials, and has a certain laminating strength and water resistance. However, in this emulsion polymerization, a traditional small molecule emulsifier such as sodium alkyl sulfonate, sodium alkyl benzene sulfonate, sodium vinyl sulfonate, alkyl phenol polyoxyethylene ether, and fatty alcohol polyoxyethylene ether ammonium sulfate was still used. The small molecule emulsifier tended to migrate to a surface of an adhesive film, forming a weak interface layer, which could reduce the laminating strength of the adhesive. In addition, $\alpha,\omega$-di(active group)siloxane, used as a crosslinking agent, needed to be hydrolyzed to form a silanol group, which then underwent a condensation reaction with a hydroxyl group on the acrylate chain. Thus, the efficiency and strength achieved through such crosslinking reaction were not ideal. The plastic-plastic laminating strength did not exceed 2N/15 mm, which was lower and much less than that achieved by using a solvent-based laminating adhesive.

CN111269350A discloses an adhesive prepared by a pre-emulsified seeded emulsion polymerization process comprising using a compounded emulsification system from a traditional small molecule anionic emulsifier and a non-ionic emulsifier, and using acetoacetoxyethyl methacrylate, glycidyl methacrylate, N-isobutoxyacrylamide as self-crosslinking monomers. The obtained adhesive could not be torn off after being laminated onto polyethylene (PE), while a laminating strength on PET film was not given. In addition, the laminating strength and water resistance of the laminating adhesive synthesized by using a small molecule emulsifier have not yet been verified.

CN103059784A discloses a pre-emulsified seeded emulsion polymerization process, in which a monomer mixture with weaker polarity and a monomer mixture with stronger polarity were added dropwise step by step to enhance stability of polymerization and make more polar groups distributed on a surface of polymer colloidal particles, thereby improving bonding strength of a substrate; an internal plasticizing monomer was used to improve flexibility of film and adhesion to the substrate; and a monomer containing two or more double bonds was used as an internal crosslinking monomer to increase the molecular weight of a polymer and improve cohesive strength of an adhesive film. The obtained aqueous plastic-plastic laminating adhesive for food and drug flexible packaging did not contain an organic solvent, did not release formaldehyde, and exhibited good adhesion, high peel strength and high sustained adhesion, and thereby could be used in the flexible packaging industry. In CN103059784A, a small molecule reactive emulsifier was used, which could reduce migration compared to traditional emulsifiers, but only a part of the small molecule reactive emulsifier could react with the monomers, and the residual part of the small molecule reactive emulsifier would still reduce the performance of the adhesive, resulting in that the adhesive exhibited a laminating strength of not exceeding 1.5N/15 mm. Therefore, the adhesive could not be used in fields with a high requirement on laminating strength, such as the field of dry battery labels, which requires that a laminated film could not be peeled off.

SUMMARY

In view of the defects pointed out above, an object of the present disclosure is to provide a method for preparing an acrylate laminating adhesive by soap-free emulsion polymerization.

In view of the defects of low laminating strength and poor water resistance of existing aqueous laminating adhesives when used in laminating plastic-plastic, aluminum-plastic, polyethylene terephthalate-vacuum metallized polyethylene terephthalate (PET-VMPET) and other materials, another object of the present disclosure is to provide an aqueous acrylate laminating adhesive as mentioned above for use in laminating flexible packaging film materials in replace of solvent-based polyurethane laminating adhesives.

A method for preparing an acrylate laminating adhesive by soap-free emulsion polymerization according to the present disclosure is specifically realized, comprising (1) adding acrylic acid, ethanol, a chain transfer agent for reversible addition-fragmentation chain transfer (RAFT chain transfer agent), and an initiator into a reactor, then vacuumizing the reactor, introducing a high-purity nitrogen into the reactor, and preforming a reaction at 60-65° C. for 24-72 h;

(2) adding butyl acrylate and an initiator into the reactor of step (1), vacuumizing the reactor, introducing nitrogen into the reactor, preforming a reaction at 60-65° C. for 12-72 h, and then vacuumizing the reactor at 60° C. to remove ethanol, to obtain an acrylic block oligomer;

(3) adding the acrylic block oligomer obtained in step (2), deionized water, an acrylate monomer, a hydroxyl-containing monomer, a carboxylic acid monomer, a chain transfer agent and an initiator into an emulsification kettle, and performing an emulsification under stirring at a high speed, to obtain a monomer pre-emulsion;

(4) adding deionized water into a reaction kettle and heating to 80-82° C., adding a part of the monomer pre-emulsion obtained in step (3) and an initiator thereto, and preforming a reaction for 20-30 min; then adding dropwise a remaining monomer pre-emulsion to the reaction kettle within 2-4 h, then keeping a resulting mixture at a temperature of 80-82° C. for 1 h, and then cooling to 65° C., and adding dropwise an aqueous solution of a reducing agent thereto for a post-treatment; then cooling a resulting mixture to a temperature of 45° C. or lower, adding aqueous ammonia thereto to adjust a pH value to be 7-8, and finally adding a wetting agent and a defoaming agent thereto, stirring to be uniform, and filtering, to obtain an acrylate laminating adhesive crude emulsion; and (5) mixing the acrylate laminating adhesive crude emulsion obtained in step (4) and an aqueous curing agent to be uniform by stirring, to obtain the acrylate laminating adhesive, which could be applied to a film for laminating application.

In some embodiments, in step (1), a mass ratio of acrylic acid, ethanol, the RAFT chain transfer agent, and the initiator is in the range of 40-60: 40-60:0.2-2:0.2-2, and in step (2), a mass ratio of butyl acrylate to the initiator is in the range of 20-40:0.1-1.

In some embodiments, a mass ratio of acrylic acid in step (1) to butyl acrylate in step (2) is in the range of 50-80:50-20.

In some embodiments, the RAFT chain transfer agent in step (1) is isopropylxanthic disulfide, and the initiators in steps (1) and (2) are azobisisobutyronitrile.

In some embodiments, in step (3), a mass ratio of the acrylic block oligomer, deionized water, the acrylate monomer, the hydroxyl-containing monomer, the carboxylic acid monomer, the chain transfer agent, and the initiator is in the range of 0.4-4:30-60:30-60:1-5:1-5:0.2-2:0.2-1.

In some embodiments, the acrylic monomer in step (3) is at least one selected from the group consisting of butyl acrylate, isooctyl acrylate, ethyl acrylate, methyl acrylate, and methyl methacrylate.

In some embodiments, the hydroxyl-containing monomer in step (3) is at least one selected from the group consisting of hydroxyethyl acrylate, hydroxyethyl methacrylate, 2-hydroxypropyl acrylate, 2-hydroxypropyl methacrylate, 4-hydroxybutyl acrylate, and hydroxyoctyl acrylate.

In some embodiments, the carboxylic acid monomer in step (3) is β-acryloyloxypropionic acid.

In some embodiments, the chain transfer agent in step (3) is n-pentanol.

In some embodiments, the initiators in steps (3) and (4) are independently selected from the group consisting of ammonium persulfate, potassium persulfate, and sodium persulfate.

In some embodiments, in step (4), a mass ratio of deionized water, the monomer pre-emulsion, the initiator, the reducing agent, the wetting agent, and the defoaming agent is in the range of 20-30:70-80:0.1-0.3:0.05-0.15:0.1-0.5: 0.05-0.2.

In some embodiments, in step (4), a mass ratio of the part of the monomer pre-emulsion to the remaining monomer pre-emulsion is in the range of 1-15: 85-99.

In some embodiments, the wetting agent in step (4) is selected from the group consisting of a silicone wetting agent and an alkynediol wetting agent.

In some embodiments, the defoaming agent in step (4) is selected from the group consisting of a silicone defoaming agent modified with polyether and a mineral oil defoaming agent.

In some embodiments, the reducing agent in step (4) is disodium hydroxy(sulfonato)acetate.

In some embodiments, in step (5), the aqueous curing agent is an aqueous polyisocyanate curing agent, and is added in an amount of 1-10% of the mass of the acrylate laminating adhesive crude emulsion.

The acrylate laminating adhesive prepared by soap-free emulsion polymerization as mentioned above is suitable for the laminating of plastic-plastic, aluminum-plastic, PET-VMPET and other flexible packaging film materials.

Compared with the prior art, the present disclosure has the following beneficial effects:

In the present disclosure, a soap-free emulsion polymerization process is used to prepare the acrylate laminating adhesive. An acrylate block oligomer with emulsifiability is synthesized by a RAFT active radical polymerization process, and an acrylate monomer is emulsified by using the acrylate block oligomer for a semi-continuous emulsion polymerization. The method according to the present disclosure overcomes a defect that traditional small molecule emulsifiers tend to migrate to a surface of an adhesive film to form a weak interface layer, resulting in a decrease in bonding strength, a poor water resistance and the like. Further, in the present disclosure, the innovative use of n-pentanol as a chain transfer agent could not only reduce the molecular weight of polymer, improving the fluidity and laminating uniformity of the adhesive, but also reduce the surface tension of the emulsion, improving the coating wettability and levelling property of the acrylate laminating adhesive. The acrylate laminating adhesive prepared by the method according to the present disclosure is suitable for the laminating of plastic-plastic, aluminum-plastic, PET-VMPET and other flexible packaging film materials, with a high laminating strength, and the laminated film could not be torn, even after being soaked in a 60° C. water bath for 72 h.

DETAILED DESCRIPTION OF THE EMBODIMENTS

The present disclosure is further described below through specific examples.

Example 1

(1) 65 g of acrylic acid, 60 g of ethanol, 0.9 g of diisopropoxymethylsulfonyl persulfide and 0.52 g of azodiisobutyronitrile were added to a reactor, obtaining a first reactant system. The reactor was then vacuumized at room temperature and nitrogen was introduced thereto. The first reactant system was reacted at 60° C. for 48 h.

(2) The resulting system after the reaction was cooled to room temperature, and 5 g of butyl acrylate and 0.28 g of azodiisobutyronitrile were added thereto, obtaining a second reactant system. The reactor was then vacuumized and nitrogen was introduced thereto. The second reactant system was reacted at 65° C. for 18 h. Subsequently, the reactor was vacuumized at 60° C., and thereby ethanol was removed, obtaining an acrylic block oligomer.

(3) 30 g of the acrylic block oligomer obtained in step (2), 1500 g of deionized water, 2025 g of butyl acrylate, 750 g of methyl methacrylate and 60 g of 0-acryloyloxypropionic acid, 150 g of hydroxyethyl methacrylate, 60 g of n-pentanol and 6 g of potassium persulfate were weighed and added into a emulsification kettle, stirred at a high speed and emulsified, obtaining an acrylate monomer pre-emulsion.

(4) Deionized water was added to a reaction kettle and was heated to 80-82° C., and 225 g of the acrylate monomer pre-emulsion obtained in step (3) and 0.9 g of potassium persulfate were then added thereto and reacted for 20-30 min. The remaining monomer pre-emulsion was added dropwise to the reaction kettle within 2-4 h. After the addition, the resulting mixture was kept at 80-82° C. for 1 h, then cooled to 65° C., and subsequently an aqueous solution of a reducing agent was added dropwise thereto for a post-treatment. The resulting system was then cooled to 45° C. or lower, and aqueous ammonia was added thereto, adjusting the pH value of the materials therein to be 5-7. Finally, 15 g of an alkynediol wetting agent and 3 g of a mineral oil defoaming agent were added to the reaction kettle, and the materials therein were stirred to be uniform, filtered and discharged, obtaining an acrylate laminating adhesive crude emulsion.

(5) The acrylate laminating adhesive crude emulsion and an aqueous polyisocyanate curing agent (in an amount of 4% of the acrylate laminating adhesive crude emulsion) were mixed to be uniform by stirring, obtaining an acrylate laminating adhesive emulsion, which could be applied directly onto a film for laminating application.

Example 2

(1) 70 g of acrylic acid, 60 g of ethanol, 0.9 g of diisopropoxymethylsulfonyl persulfide and 0.56 g of azodiisobutyronitrile were added to a reactor, obtaining a first reactant system. The reactor was then vacuumized at room temperature and nitrogen was introduced thereto. The first reactant system was reacted at 60° C. for 48 h.

(2) The resulting system after the reaction was cooled to room temperature, and 30 g of butyl acrylate and 0.24 g of azodiisobutyronitrile were added thereto, obtaining a second reactant system. The reactor was then vacuumized and nitrogen was introduced thereto. The second reactant system was reacted at 60° C. for 36 h. Subsequently, the reactor was vacuumized at 60° C., and thereby ethanol was removed, obtaining an acrylic block oligomer.

(3) 45 g of the acrylic block oligomer obtained in step (2), 1500 g of deionized water, 1995 g of butyl acrylate, 750 g of methyl methacrylate and 60 g of β-acryloyloxypropionic acid, 180 g of hydroxyethyl methacrylate, 75 g of n-pentanol and 6 g of ammonium persulfate were weighed and added into a emulsification kettle, stirred at a high speed and emulsified, obtaining an acrylate monomer pre-emulsion.

(4) Deionized water was added to a reaction kettle and was heated to 80-82° C., and 270 g of the acrylate monomer pre-emulsion obtained in step (3) and 0.6 g of ammonium persulfate were then added thereto and reacted for 20-30 min. The remaining monomer pre-emulsion was then added dropwise to the reaction kettle within 2-4 h. After the addition, the resulting mixture was kept at 80-82° C. for 1 h, then cooled to 65° C., and subsequently an aqueous solution of a reducing agent was added dropwise thereto for a post-treatment. The resulting system was then cooled to 65° C., and aqueous ammonia was added thereto, adjusting the pH value of the materials therein to be 5-7. Finally, 12 g of a silicone wetting agent and 1.5 g of a silicone defoaming agent modified with polyether were added to the reaction kettle, and the materials therein were stirred to be uniform, filtered and discharged, obtaining an acrylate laminating adhesive crude emulsion.

(5) The acrylate laminating adhesive crude emulsion and an aqueous polyisocyanate curing agent (in an amount of 6% of the acrylate laminating adhesive crude emulsion) were mixed to be uniform by stirring, obtaining an acrylate laminating adhesive emulsion, which could be applied directly onto a film for laminating application.

Example 3

(1) 65 g of acrylic acid, 60 g of ethanol, 1.2 g of diisopropoxymethylsulfonyl persulfide and 0.65 g of azodiisobutyronitrile were added to a reactor, obtaining a first reactant system. The reactor was then vacuumized at room temperature and nitrogen was introduced thereto. The first reactant system was reacted at 60° C. for 48 h.

(2) The system after the reaction was cooled to room temperature, and 35 g of butyl acrylate and 0.35 g of azodiisobutyronitrile were added thereto, obtaining a second reactant system. The reactor was then vacuumized and nitrogen was introduced thereto. The second reactant system was reacted at 62° C. for 24 h. Subsequently, the reactor was vacuumized at 60° C., and thereby ethanol was removed, obtaining an acrylic block oligomer.

(3) 24 g of the acrylic block oligomer obtained in step (2), 1500 g of deionized water, 1245 g of butyl acrylate, 600 g of isooctyl acrylate, 900 g of methyl methacrylate and 60 g of β-acryloyloxypropionic acid, 150 g of hydroxyethyl methacrylate, 60 g of n-pentanol and 6 g of sodium persulfate were weighed and added into a emulsification kettle, stirred at a high speed and emulsified, obtaining an acrylate monomer pre-emulsion.

(4) Deionized water was added to a reaction kettle and heated to 80-82° C., and 360 g of the acrylate monomer pre-emulsion obtained in step (3) and 9 g of sodium persulfate were then added thereto and reacted for 20-30 min. The remaining monomer pre-emulsion was then added dropwise to the reaction kettle within 2-4 h. After the addition, the resulting mixture was kept at 80-82° C. for 1 h, then cooled to 65° C., and subsequently an aqueous solution of a reducing agent was added dropwise thereto for a post-treatment. The reaction kettle was then cooled to 65° C., and aqueous ammonia was added thereto, adjusting the pH value of the materials therein to be 5-7. Finally, 21 g of an alkynediol wetting agent and 6 g of a mineral oil defoaming agent were added to the reaction kettle and the materials therein were stirred to be uniform, filtered and discharged, obtaining an acrylate laminating adhesive crude emulsion.

(5) The acrylate laminating adhesive crude emulsion and an aqueous polyisocyanate curing agent (in an amount of 6% of the acrylate laminating adhesive crude emulsion) were mixed to be uniform by stirring, obtaining an acrylate laminating adhesive emulsion, which could be applied directly onto a film for laminating application.

Example 4

(1) 70 g of acrylic acid, 60 g of ethanol, 1.5 g of diisopropoxymethylsulfonyl persulfide and 0.7 g of azodiisobutyronitrile were added to a reactor, obtaining a first reactant system. The reactor was then vacuumized at room temperature and nitrogen was introduced thereto. The first reactant system was reacted at 60° C. for 48 h.

(2) The resulting system after the reaction was cooled to room temperature, and 30 g of butyl acrylate and 0.36 g of azodiisobutyronitrile were added thereto, obtaining a second reactant system. The reactor was then vacuumized and nitrogen was introduced thereto. The second reactant system was reacted at 65° C. for 24 h. Subsequently, the reactor was vacuumized at 60° C., and thereby ethanol was removed, obtaining an acrylic block oligomer.

(3) 60 g of the acrylic block oligomer obtained in step (2), 1500 g of deionized water, 1575 g of butyl acrylate, 300 g of isooctyl acrylate, 30 g of hydroxyethyl acrylate, 840 g of methyl methacrylate and 90 g of β-acryloyloxypropionic acid, 180 g of hydroxyethyl methacrylate, 90 g of n-pentanol and 6 g of ammonium persulfate were weighed and added into a emulsification kettle, stirred at a high speed and emulsified, obtaining an acrylate monomer pre-emulsion.

(4) Deionized water was added to a reaction kettle and was heated to 80-82° C., and 180 g of the acrylate monomer pre-emulsion obtained in step (3) and 6 g of ammonium persulfate were then added thereto and reacted for 20-30 min. The remaining monomer pre-emulsion was added dropwise to the reaction kettle within 2-4 h. After the addition, the resulting mixture was kept at 80-82° C. for 1 h, then cooled to 65° C., and subsequently an aqueous solution of a reducing agent was added dropwise thereto for a post-treatment. The reaction kettle was then cooled to 45° C. or lower, and aqueous ammonia was added thereto, adjusting the pH value of the materials therein to be 5-7. Finally, 18 of a silicone wetting agent and 3 g of a silicone defoaming agent modified with polyether were added to the reaction kettle and the materials therein were stirred to be uniform, filtered and discharged, obtaining an acrylate laminating adhesive crude emulsion.

(5) The acrylate laminating adhesive crude emulsion and an aqueous polyisocyanate curing agent (in an amount of 3% of the acrylate laminating adhesive crude emulsion) were mixed to be uniform by stirring, obtaining an acrylate laminating adhesive emulsion which could be applied directly onto a film for laminating application.

The laminating strength and water resistance of these acrylate laminating adhesive emulsions were tested. The test samples were PET-VMPET laminated film materials prepared by coating, drying, laminating and curing the acrylate laminating adhesive emulsion between PET and VMPET film materials.

The laminating strength was tested according to a test method for peel force of flexible laminated plastics, as described in GB/T8808.

The water resistance was tested as follows: the test samples were soaked in 60° C. warm water for 72 h, and their peeling strengths were then tested. The results are shown in Table 1.

TABLE 1

Properties of acrylate laminating adhesive emulsions prepared by soap-free emulsion polymerization according to Examples 1-4

| Example No. | Peeling strength (N/15 mm) | Water resistance |
| --- | --- | --- |
| Example 1 | Film is broken and could not be stripped | No whitening, and not stripped |
| Example 2 | Film is broken and could not be stripped | No whitening, and not stripped |
| Example 3 | Film is broken and could not be stripped | No whitening, and not stripped |
| Example 4 | 4.8 | No whitening, and a peel force being 4.6 |

As can be seen from Table 1, the acrylate laminating adhesive emulsions prepared by soap-free emulsion polymerization in the present disclosure achieves excellent laminating strength and water resistance, and a laminated film that could not be stripped, which are comparable to those of solvent-based polyurethane laminating adhesives. Therefore, it could be widely applied to the laminating of flexible packaging materials such as plastic-plastic, aluminum-plastic and PET-VMPET.

What is claimed is:

1. A method for preparing an acrylate laminating adhesive crude emulsion by soap-free emulsion polymerization, comprising steps of
   (1) adding acrylic acid, ethanol, a RAFT chain transfer agent, and a first initiator into a reactor, then vacuumizing the reactor, introducing a nitrogen into the reactor, and performing a reaction at 60-65° C. for 24-72 h;
   (2) adding butyl acrylate and a second initiator into the reactor of step (1), vacuumizing the reactor, introducing nitrogen into the reactor, performing a reaction at 60-65° C. for 12-72 h, and then vacuumizing the reactor at 60° C. to remove ethanol, to obtain an acrylic block oligomer;
   (3) adding the acrylic block oligomer obtained in step (2), deionized water, an acrylate monomer, a hydroxyl-containing monomer, a carboxylic acid monomer, a chain transfer agent and a third initiator into an emulsification kettle, and performing an emulsification under stirring, to obtain a monomer pre-emulsion; and
   (4) adding deionized water into a reaction kettle and heating to 80-82° C., adding a part of the monomer pre-emulsion obtained in step (3) and a fourth initiator into the reaction kettle, and performing a reaction for 20-30 min; then adding dropwise a remaining monomer pre-emulsion to the reaction kettle within 2-4 h, then keeping a first resulting mixture at a temperature of 80-82° C. for 1 h, and then cooling to 65° C., and adding dropwise an aqueous solution of a reducing agent thereto for a post-treatment; then cooling a second resulting mixture to a temperature of 45° C. or lower, adding aqueous ammonia thereto to adjust a pH value to be 7-8, and finally adding a wetting agent and a defoaming agent thereto, stirring to be uniform, and filtering, to obtain the acrylate laminating adhesive crude emulsion.

2. An acrylate laminating adhesive crude emulsion prepared by the method of claim 1.

3. A method for preparing an acrylate laminating adhesive by soap-free emulsion polymerization, comprising steps of
   (1) adding acrylic acid, ethanol, a RAFT chain transfer agent, and a first initiator into a reactor, then vacuumizing the reactor, introducing a nitrogen into the reactor, and performing a reaction at 60-65° C. for 24-72 h;
   (2) adding butyl acrylate and a second initiator into the reactor of step (1), vacuumizing the reactor, introducing nitrogen into the reactor, performing a reaction at 60-65° C. for 12-72 h, and then vacuumizing the reactor at 60° C. to remove ethanol, to obtain an acrylic block oligomer;

(3) adding the acrylic block oligomer obtained in step (2), deionized water, an acrylate monomer, a hydroxyl-containing monomer, a carboxylic acid monomer, a chain transfer agent and a third initiator into an emulsification kettle, and performing an emulsification under stirring, to obtain a monomer pre-emulsion;

(4) adding deionized water into a reaction kettle and heating to 80-82° C., adding a part of the monomer pre-emulsion obtained in step (3) and a fourth initiator into the reaction kettle, and performing a reaction for 20-30 min; then adding dropwise a remaining part of the monomer pre-emulsion to the reaction kettle within 2-4 h, then keeping a first resulting mixture at a temperature of 80-82° C. for 1 h, and then cooling to 65° C., and adding dropwise an aqueous solution of a reducing agent thereto for a post-treatment; then cooling a second resulting mixture to a temperature of 45° C. or lower, adding aqueous ammonia thereto to adjust a pH value to be 7-8, and finally adding a wetting agent and a defoaming agent thereto, stirring to be uniform, and filtering, to obtain an acrylate laminating adhesive crude emulsion; and (5) mixing the acrylate laminating adhesive crude emulsion obtained in step (4) and an aqueous curing agent to be uniform by stirring, to obtain the acrylate laminating adhesive.

4. The method of claim 1, wherein in step (1), a mass ratio of acrylic acid, ethanol, the RAFT chain transfer agent and the first initiator is in the range of 40-60:40-60:0.2-2:0.2-2; and in step (2), a mass ratio of butyl acrylate to the second initiator is in the range of 20-40:0.1-1.

5. The method of claim 1, wherein the RAFT chain transfer agent in step (1) is isopropylxanthic disulfide, and the first initiator and the second initiator each are azobisisobutyronitrile.

6. The method of claim 1, wherein in step (3), a mass ratio of the acrylic block oligomer, deionized water, the acrylate monomer, the hydroxyl-containing monomer, the carboxylic acid monomer, the chain transfer agent, and the third initiator is in the range of 0.4-4:30-60:30-60:1-5:1-5:0.2-2:0.2-1.

7. The method of claim 1, wherein in step (3), a mass ratio of the acrylic block oligomer, deionized water, the acrylate monomer, the hydroxyl-containing monomer, the carboxylic acid monomer, the chain transfer agent, and the third initiator is 30 g:1500 g:2775 g:150 g:60 g:60 g:6 g, 45 g:1500 g:2745 g:180 g:60 g:75 g:6 g, or 24 g:1500 g:2745 g:150 g:60 g:60 g:6 g.

8. The method of claim 1, wherein the acrylic monomer in step (3) is at least one selected from the group consisting of butyl acrylate, isooctyl acrylate, ethyl acrylate, methyl acrylate, and methyl methacrylate.

9. The method of claim 1, wherein the hydroxyl-containing monomer in step (3) is at least one selected from the group consisting of hydroxyethyl acrylate, hydroxyethyl methacrylate, 2-hydroxypropyl acrylate, 2-hydroxypropyl methacrylate, 4-hydroxybutyl acrylate, and hydroxyoctyl acrylate;

the carboxylic acid monomer in step (3) is β-acryloyloxypropionic acid;

the chain transfer agent in step (3) is n-pentanol; and the third initiator and the fourth initiator are independently selected from the group consisting of ammonium persulfate, potassium persulfate, and sodium persulfate.

10. The method of claim 1, wherein in step (4), a mass ratio of deionized water, the monomer pre-emulsion, the fourth initiator, the reducing agent, the wetting agent, and the defoaming agent is in the range of 20-30:70-80:0.1-0.3:0.05-0.15:0.1-0.5:0.05-0.2.

11. The method of claim 1, wherein in step (4), a mass ratio of the part of the monomer pre-emulsion to the remaining monomer pre-emulsion is in the range of 1-15:85-99.

12. The method of claim 1, wherein in step (4), the wetting agent is selected from the group consisting of a silicone wetting agent and an alkynediol wetting agent, the defoaming agent is selected from the group consisting of a silicone defoaming agent modified with polyether and a mineral oil defoaming agent, and the reducing agent is disodium hydroxy(sulfonato)acetate.

13. The method for preparing the acrylate laminating adhesive by soap-free emulsion polymerization of claim 3, wherein in step (5), the aqueous curing agent is an aqueous polyisocyanate curing agent, and is added in an amount of 1-10% of the mass of the acrylate laminating adhesive crude emulsion.

14. An acrylate laminating adhesive prepared by the method of claim 3.

15. A method of using the acrylate laminating adhesive of claim 14 in the laminating of a flexible packaging film material, comprising applying the acrylate laminating adhesive to a film material for laminating.

16. The method of claim 3, wherein in step (1), a mass ratio of acrylic acid, ethanol, the RAFT chain transfer agent and the first initiator is in the range of 40-60:40-60:0.2-2:0.2-2; and in step (2), a mass ratio of butyl acrylate to the second initiator is in the range of 20-40:0.1-1.

17. The method of claim 3, wherein the RAFT chain transfer agent in step (1) is isopropylxanthic disulfide, and the first initiator and the second initiator each are azobisisobutyronitrile.

18. The method of claim 3, wherein in step (3), a mass ratio of the acrylic block oligomer, deionized water, the acrylate monomer, the hydroxyl-containing monomer, the carboxylic acid monomer, the chain transfer agent, and the third initiator is in the range of 0.4-4:30-60:30-60:1-5:1-5:0.2-2:0.2-1.

19. The method of claim 3, wherein in step (3), a mass ratio of the acrylic block oligomer, deionized water, the acrylate monomer, the hydroxyl-containing monomer, the carboxylic acid monomer, the chain transfer agent, and the third initiator is 30 g:1500 g:2775 g:150 g:60 g:60 g:6 g, 45 g:1500 g:2745 g:180 g:60 g:75 g:6 g, or 24 g:1500 g:2745 g:150 g:60 g:60 g:6 g.

* * * * *